United States Patent [19]

Nishioka et al.

[11] Patent Number: 4,753,905

[45] Date of Patent: Jun. 28, 1988

[54] DIELECTRIC CERAMIC COMPOSITION

[75] Inventors: Goro Nishioka, Ibaraki; Yukio Sakabe, Kyoto; Junichi Imanari, Mito; Masaru Fujino, Nagaokakyo, all of Japan

[73] Assignee: Murata Manufacturing Co., Ltd., Japan

[21] Appl. No.: 891,470

[22] Filed: Jul. 29, 1986

[30] Foreign Application Priority Data

Jul. 31, 1985 [JP] Japan .................. 60-170154
Jul. 31, 1985 [JP] Japan .................. 60-170156

[51] Int. Cl.$^4$ ........................... C04B 35/46
[52] U.S. Cl. ..................... 501/136; 501/134; 501/135
[58] Field of Search .............. 501/134, 135, 136

[56] References Cited

U.S. PATENT DOCUMENTS

| 4,339,544 | 7/1982 | Sakabe et al. | 501/136 |
| 4,544,644 | 10/1985 | Yamashita | 501/134 |
| 4,555,494 | 11/1985 | Nishida et al. | 501/134 |
| 4,601,988 | 7/1986 | Sakabe et al. | 501/134 |
| 4,601,989 | 7/1986 | Sakabe et al. | 501/136 |

FOREIGN PATENT DOCUMENTS

| 3520839 | 12/1985 | Fed. Rep. of Germany | 501/134 |
| 60-36365 | 2/1985 | Japan | 501/134 |
| 60-36366 | 2/1985 | Japan | 501/134 |
| 60-151272 | 8/1985 | Japan | 501/135 |
| 2004268 | 3/1970 | United Kingdom | 501/134 |
| 2035994 | 6/1980 | United Kingdom |  |
| 543642 | 1/1977 | U.S.S.R. | 501/134 |

Primary Examiner—Mark L. Bell
Assistant Examiner—A. Knab
Attorney, Agent, or Firm—Ostrolenk, Faber, Gerb & Soffen

[57] ABSTRACT

A dielectric ceramic composition consists essentially of a main component composed of a solid solution of a three component system $Pb(Mg_{\frac{1}{3}}Nb_{\frac{2}{3}})O_3$-$Pb(Zn_{\frac{1}{3}}Nb_{\frac{2}{3}})O_3$-$PbTiO_3$, characterized in that said main component consists essentially of 68.05 to 69.60 wt % of $Pb_3O_4$, 2.41 to 4.00 wt % of MgO, 0.08 to 3.15 wt % of ZnO, 24.01 to 26.66 wt % of $Nb_2O_5$, and 0.13 to 2.59 wt % of $TiO_2$, and has a set of compositional proportions of the three components falling within an area defined by a polygon ABCD encompassed by points A, B, C, and D in FIG. 1, and that a subsidiary component consisting essentially of MgO is incorporated into said main component in an amount of not more than 1.0 part by weight (except 0 part by weight) with respect to 100 part by weight of the main component. The composition may further contain, as a part of the subsidiary component, manganese and/or a compound represented by the general formula: $A(Cu_{\frac{1}{2}}W_{\frac{1}{2}})O_3$ (wherein A is one or more elements selected from the group consisting of Pb, Ba, Sr, and Ca).

8 Claims, 1 Drawing Sheet

DIELECTRIC CERAMIC COMPOSITION

FIELD OF THE INVENTION

This invention relates to a dielectric ceramic composition.

BACKGROUND OF THE INVENTION

As a dielectric material for capacitors, there have been used high permittivity ceramic materials such as those consisting essentially of $BaTiO_3$ and containing one or more secondary components such as, for example, $CaTiO_3$, $BaSnO_3$, $CaZrO_3$, and $SrTiO_3$. These dielectric ceramic materials have a dielectric constant ranging from 2000 to 15000 at room temperature, but they have a very high sintering temperature of 1300° to 1400° C. Sintering at such a high temperature consumes a large amount of energy, resulting in a considerable increase in the cost of sintering.

In addition, when these ceramic materials are used as a dielectric material for manufacture of monolithic ceramic capacitors, use of an expensive noble metal such as Pt and Pd as a material for internal electrodes is required. Monolithic ceramic capacitors are generally manufactured by forming green ceramic sheets, screening internal electrodes on the respective green sheets, stacking and pressing the green sheets to form monolithic bodies, and then firing the same at 1300° to 1400° C. Since the internal electrodes are heated up to the sintering temperature of the ceramic material, a material for internal electrodes is required not to melt, not to react with the ceramic dielectrics, or not to be oxidized even at a high temperature of 1300° C. and above. However, the use of the noble metal prevents lowering the manufacturing cost of the monolithic ceramic capacitors because of the high cost of the noble metal.

To solve these problems, inventors of the present application have proposed in Japanese Patent Laying-Open No. 57-27974 to use a dielectric ceramic composition of a $Pb(Mg_{\frac{1}{3}}Nb_{\frac{2}{3}})O_3$-$Pb(Zn_{\frac{1}{3}}Nb_{\frac{2}{3}})O_3$-$PbTiO_3$ system. This composition has a dielectric constant of 10000 and above and a low sintering temperature of 1030° to 1150° C. However, there is an increasing demand of development of a dielectric ceramic composition with a higher dielectric constant. In addition, it has been required to develop a dielectric ceramic composition which satisfies standards for temperature characteristics of static capacity defined under EIA standard Z5U.

SUMMARY OF THE INVENTION

It is therefore an object of the present invention to provide a dielectric ceramic composition which has a high dielectric constant of not less than 15000, a high specific resistance of $10^{11}$ $\Omega$-cm at a temperature ranging from 25° to 85° C., and a sintering temperature of not more than 1150° C.

Another object of the present invention is to provide a dielectric ceramic composition which has a high dielectric constant of not less than 15000 and a high specific resistance of $10^{11}$ $\Omega$-cm at a temperature ranging from 25° to 85° C., and satisfies standards for temperature characteristics of static capacity defined under EIA standards Z5U.

According to the present invention, these and other objects are solved by providing a dielectric ceramic composition consisting essentially of a main component composed of a solid solution of a three component system $Pb(Mg_{\frac{1}{3}}Nb_{\frac{2}{3}})O_3$-$Pb(Zn_{\frac{1}{3}}Nb_{\frac{2}{3}})O_3$-$PbTiO_3$, characterized in that said main component consists essentially of 68.05 to 69.60 wt% of $Pb_3O_4$, 2.41 to 4.00 wt% of MgO, 0.08 to 3.15 wt% of ZnO, 24.01 to 26.66 wt% of $Nb_2O_5$, and 0.13 to 2.59 wt% of $TiO_2$, and has a set of compositional proportions of the three components, $Pb(Mg_{\frac{1}{3}}Nb_{\frac{2}{3}})O_3$, $Pb(Zn_{\frac{1}{3}}Nb_{\frac{2}{3}})O_3$, and $PbTiO_3$, falling within an area defined by a polygon ABCD encompassed by vertices A, B, C, and D in FIG. 1, the sets of proportions of the three components at the vertices A, B, C, and D of the polygon being in weight % as follows:

|   | $Pb(Mg_{\frac{1}{3}}Nb_{\frac{2}{3}})O_3$ | $Pb(Zn_{\frac{1}{3}}Nb_{\frac{2}{3}})O_3$ | $PbTiO_3$ |
|---|---|---|---|
| A | 89.0 | 1.0 | 10.0 |
| B | 80.0 | 10.0 | 10.0 |
| C | 59.5 | 40.0 | 0.5 |
| D | 98.5 | 1.0 | 0.5 | that a subsidiary component consisting essentially of MgO is incorporated into the main component in an amount of not more than 1.0 part by weight (except 0 part by weight) with respect to 100 part by weight of the main component.

The dielectric ceramic composition of the present invention may further contain, as a part of the subsidiary component, manganese in addition to not more than 1.0 part by weight of MgO. The content of manganese is not more than 0.5 part by weight (except 0 part by weight) in terms of $MnO_2$ with respect to 100 parts by weight of the main component.

The dielectric ceramic composition may further contain, as a part of the subsidiary component, either or both manganese and a compound represented by the general formula:

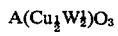

$A(Cu_{\frac{1}{3}}W_{\frac{2}{3}})O_3$ (wherein A is one or more elements selected from the group consisting of Pb, Ba, Sr, and Ca). Preferably, the content of manganese is not more than 0.5 part by weight (except o part by weight) in terms of $MnO_2$ with respect to 100 parts by weight of the main component, and a content of said compound is from 0.5 to 5.0 parts by weight with respect to 100 parts by weight of the main component.

Thus, according to the present invention, there is provided a dielectric ceramic composition consisting essentially of a main component composed of a solid solution of a three component system $Pb(Mg_{\frac{1}{3}}Nb_{\frac{2}{3}})O_3$-$Pb(Zn_{\frac{1}{3}}Nb_{\frac{2}{3}})O_3$-$PbTiO_3$, characterized in that said main component consists essentially of 68.05 to Z69.60 wt% of $Pb_3O_4$, 2.41 to 4.00 wt% of MgO, 0.08 to 3.15 wt% of ZnO, 24.01 to 26.66 wt% of $Nb_2O_5$ and 0.13 to 2.59 wt% of $TiO_2$, and has a set of compositional proportions of the three components, $Pb(Mg_{\frac{1}{3}}Nb_{\frac{2}{3}})O_3$, $Pb(Zn_{\frac{1}{3}}Nb_{\frac{2}{3}})O_3$, and $PbTiO_3$, falling within an area defined by a polygon ABCD encompassed by vertices A, B, C, and D in FIG. 1, the sets of proportions of the three components at the vertices A, B, C, and D of the polygon being in weight % as follows:

|   | $Pb(Mg_{\frac{1}{3}}Nb_{\frac{2}{3}})O_3$ | $Pb(Zn_{\frac{1}{3}}Nb_{\frac{2}{3}})O_3$ | $PbTiO_3$ |
|---|---|---|---|
| A | 89.0 | 1.0 | 10.0 |
| B | 80.0 | 10.0 | 10.0 |
| C | 59.5 | 40.0 | 0.5 |
| D | 98.5 | 1.0 | 0.5 | that a subsidiary component consisting essentially of MgO and a compound represented by the general formula: $A(Cu_{\frac{1}{2}}W_{\frac{1}{2}})O_3$ (wherein A is one or more elements selected from the group consisting of Pb, Ba, Sr, and Ca), is incorporated into the main component, the content of MgO being not more than 1.0 part by weight (except 0 part by weight) with respect to 100 part by weight of the main component, the content of said compound being from 0.5 to 5.0 parts by weight with respect to 100 parts by weight of the main component.

The dielectric ceramic composition according to the present invention possesses a high dielectric constant of 15000 and above, a low dielectric loss tangent (tan δ) of less than 3%, a specific resistance of $10^{11}$ Ω-cm at a temperature ranging from room temperature to an elevated temperature (85° C.), and a sintering temperature of less than 1150° C. Thus, the use of the dielectric ceramic composition of the present invention makes it possible to achieve miniaturization of ceramic capacitors, in particular, monolithic ceramic capacitors, increase capacity, decrease cost, reduction of energy consumption and stability of manufacture of ceramic capacitors.

The objects, features and advantages of the present invention will be further apparent from the following description taken in conjunction of examples and the accompanying drawings.

EXAMPLE 1

Figure 1:
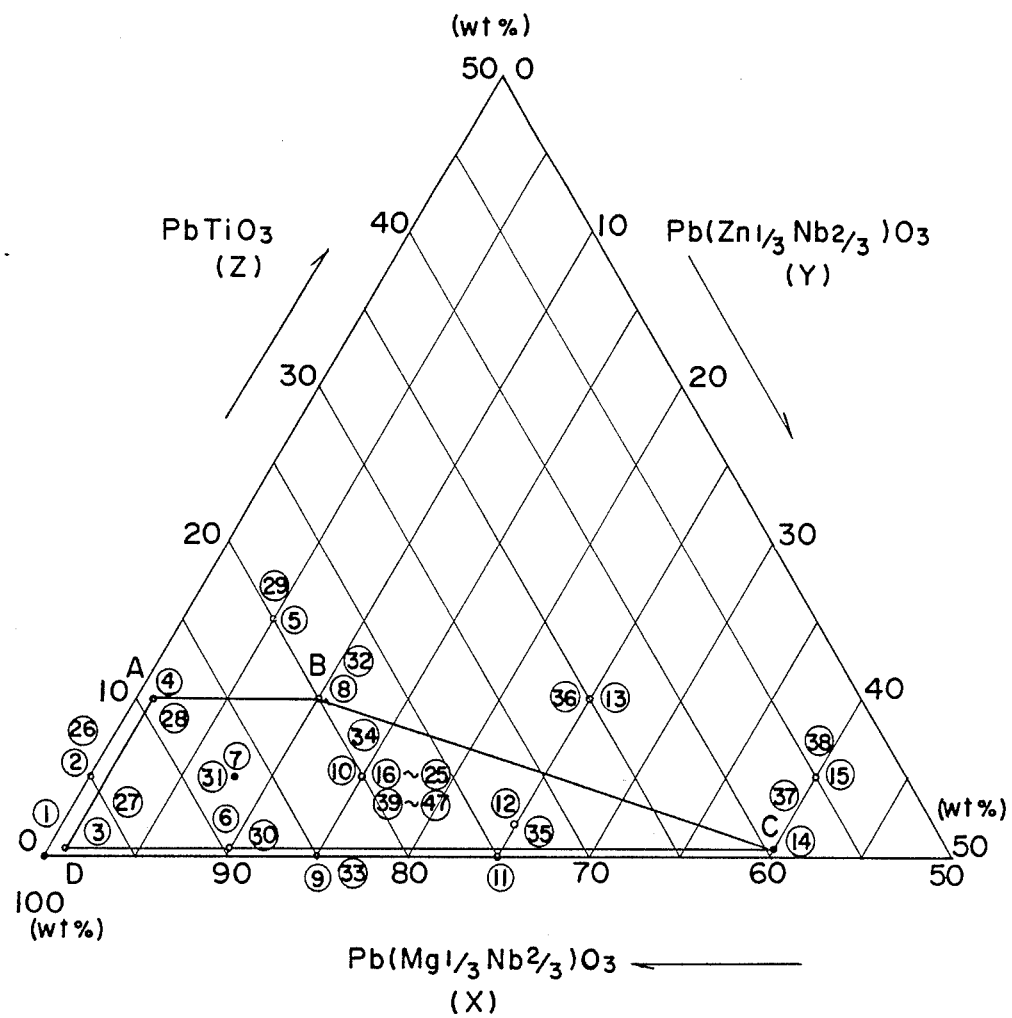
FIG. 1 shows a ternary phase diagram showing compositional area for a main component of a dielectric ceramic composition according to the present invention.

As raw materials, there were prepared industrial compounds, $Pb_3O_4$, MgO, $NB_2O_5$, $TiO_2$, ZnO, $MnCO_3$. The raw materials were weighed and then calcined at a temperature mentioned below for 2 hours to prepare powder of compounds $Pb(Mg_{\frac{1}{3}}Nb_{\frac{2}{3}})O_3$, $Pb(Zn_{\frac{1}{3}}Nb_{\frac{2}{3}})O_3$, and $PbTiO_3$, respectively. A mixture of raw materials for $PbTiO_3$ was calcined at 850° C., while mixtures of raw materials for the other compounds, $Pb(Mg_{\frac{1}{3}}Nb_{\frac{2}{3}})O_3$ and $Pb(Zn_{\frac{1}{3}}Nb_{\frac{2}{3}})O_3$, were at 950° C., respectively.

The thus prepared three compounds were weighed together with MgO and $MnCO_3$ in proportions shown in Table 1, and then milled in a ball mill together with 5 parts by weight of vinyl acetate binder for 10 to 20 hours by the wet process. The resultant mixture was evaporated, screened and then shaped into discs with a diameter of 12 mm and a thickness of 1.5 mm under a pressure of 1 ton/cm². The discs were fired in a lead-containing atmosphere at a temperature listed in Table 1 for 1 hour by an electric furnace.

TABLE 1

| No. | Main Component (wt %) | | | Subsidiary Component (wt %) | | Individual Oxides (wt %) Main Component = 100 wt % | | | | | Subsidiary Component | | Sintering Temp. (°C.) |
|---|---|---|---|---|---|---|---|---|---|---|---|---|---|
| | X | Y | Z | MgO | $MnO_2$ | $Pb_3O_4$ | MgO | $Nb_2O_5$ | $TiO_2$ | ZnO | MgO | $MnO_2$ | |
| 1* | 100 | 0 | 0 | 0.5 | 0 | 69.14 | 4.06 | 26.80 | 0 | 0 | 0.5 | 0 | 1180 |
| 2* | 95.0 | 0 | 5.0 | 0.5 | 0 | 69.38 | 3.86 | 25.46 | 1.30 | 0 | 0.5 | 0 | 1180 |
| 3 | 98.5 | 1.0 | 0.5 | 0.5 | 0 | 69.13 | 4.00 | 26.66 | 0.13 | 0.08 | 0.5 | 0 | 1150 |
| 4 | 89.0 | 1.0 | 10.0 | 0.5 | 0 | 69.60 | 3.62 | 24.13 | 2.57 | 0.08 | 0.5 | 0 | 1150 |
| 5* | 80.0 | 5.0 | 15.0 | 0.5 | 0 | 69.75 | 3.25 | 22.73 | 3.88 | 0.39 | 0.5 | 0 | 1170 |
| 6 | 89.5 | 10.0 | 0.5 | 0.5 | 0 | 68.89 | 3.64 | 26.56 | 0.13 | 0.78 | 0.5 | 0 | 1050 |
| 7 | 87.0 | 8.0 | 5.0 | 0.5 | 0 | 69.16 | 3.54 | 25.38 | 1.29 | 0.63 | 0.5 | 0 | 1070 |
| 8 | 80.0 | 10.0 | 10.0 | 0.5 | 0 | 69.36 | 3.25 | 24.02 | 2.59 | 0.78 | 0.5 | 0 | 1080 |
| 9* | 85.0 | 15.0 | 0 | 0.5 | 0 | 68.72 | 3.45 | 26.64 | 0 | 1.18 | 0.5 | 0 | 1050 |
| 10 | 80.0 | 15.0 | 5.0 | 0.5 | 0 | 68.97 | 3.25 | 25.31 | 1.29 | 1.18 | 0.5 | 0 | 1050 |
| 11* | 75.0 | 25.0 | 0 | 0.5 | 0 | 68.44 | 3.05 | 26.54 | 0 | 1.97 | 0.5 | 0 | 1050 |
| 12 | 73.0 | 25.0 | 2.0 | 0.5 | 0 | 68.55 | 2.96 | 26.00 | 0.52 | 1.97 | 0.5 | 0 | 1050 |
| 13* | 65.0 | 25.0 | 10.0 | 0.5 | 0 | 68.96 | 2.64 | 23.87 | 2.56 | 1.97 | 0.5 | 0 | 1070 |
| 14 | 59.5 | 40.0 | 0.5 | 0.5 | 0 | 68.06 | 2.41 | 26.25 | 0.13 | 3.15 | 0.5 | 0 | 1050 |
| 15* | 55.0 | 40.0 | 5.0 | 0.5 | 0 | 68.29 | 2.23 | 25.04 | 1.29 | 3.15 | 0.5 | 0 | 1070 |
| 16* | 80.0 | 15.0 | 5.0 | 0 | 0 | 68.97 | 3.25 | 25.31 | 1.29 | 1.18 | 0 | 0 | 1050 |
| 17 | 80.0 | 15.0 | 5.0 | 0.1 | 0 | 68.97 | 3.25 | 25.31 | 1.29 | 1.18 | 0.1 | 0 | 1100 |
| 18 | 80.0 | 15.0 | 5.0 | 0.3 | 0 | 68.97 | 3.25 | 25.31 | 1.29 | 1.18 | 0.3 | 0 | 1070 |
| 19 | 80.0 | 15.0 | 5.0 | 0.7 | 0 | 68.97 | 3.25 | 25.31 | 1.29 | 1.18 | 0.7 | 0 | 1070 |
| 20 | 80.0 | 15.0 | 5.0 | 1.0 | 0 | 68.97 | 3.25 | 25.31 | 1.29 | 1.18 | 1.0 | 0 | 1100 |
| 21* | 80.0 | 15.0 | 5.0 | 2.0 | 0 | 68.97 | 3.25 | 25.31 | 1.29 | 1.18 | 2.0 | 0 | 1170 |
| 22 | 80.0 | 15.0 | 5.0 | 0.5 | 0.1 | 68.97 | 3.25 | 25.31 | 1.29 | 1.18 | 0.5 | 0.1 | 1030 |
| 23 | 80.0 | 15.0 | 5.0 | 0.5 | 0.3 | 68.97 | 3.25 | 25.31 | 1.29 | 1.18 | 0.5 | 0.3 | 1030 |
| 24 | 80.0 | 15.0 | 5.0 | 0.5 | 0.5 | 68.97 | 3.25 | 25.31 | 1.29 | 1.18 | 0.5 | 0.5 | 1030 |
| 25* | 80.0 | 15.0 | 5.0 | 0.5 | 0.7 | 68.97 | 3.25 | 25.31 | 1.29 | 1.18 | 0.5 | 0.7 | 1030 |

Each resultant ceramic disc was provided on its both sides with silver electrodes by applying a silver (Ag) paste and then baking the same at 800° C. to prepare specimens for measurements of electrical properties.

The measurements were made on dielectric constant (ε), dielectric loss tangent (tan δ) and specific resistance (ρ). The dielectric constant (ε) and dielectric loss tangent (tan δ) were measured at a temperature of 25° C., a frequency of 1 KHz and a voltage of 1 V r.m.s. The specific resistances (ρ) were measured after applying a DC voltage of 500 V for 2 minutes at 25° C. and 85° C. Results are shown in Table 2.

In Tables 1 and 2, specimens with an asterisk (*) are those having a composition beyond the scope of the present invention, while other specimens are those included in the scope of the present invention.

TABLE 2

| Specimen No. | ε at 25° C. temp(°C.) | tan δ at 25° C. (%) | Specific Resistance (Ω cm) | |
|---|---|---|---|---|
| | | | At 25° C. | At 85° C. |
| 1* | 6300 | 0.35 | $8.5 \times 10^{12}$ | $8.7 \times 10^{11}$ |
| 2* | 12300 | 0.28 | $9.1 \times 10^{12}$ | $9.3 \times 10^{11}$ |
| 3 | 15700 | 0.18 | $9.7 \times 10^{12}$ | $9.3 \times 10^{11}$ |
| 4 | 16400 | 0.45 | $1.5 \times 10^{13}$ | $9.8 \times 10^{11}$ |
| 5* | 11400 | 4.32 | $7.3 \times 10^{12}$ | $5.8 \times 10^{11}$ |
| 6 | 17300 | 1.32 | $6.7 \times 10^{12}$ | $5.1 \times 10^{11}$ |
| 7 | 24600 | 1.10 | $7.4 \times 10^{12}$ | $5.8 \times 10^{11}$ |
| 8 | 18500 | 1.35 | $7.3 \times 10^{12}$ | $8.3 \times 10^{11}$ |

TABLE 2-continued

| Specimen No. | $\epsilon$ at 25° C. temp(°C.) | tan δ at 25° C. (%) | Specific Resistance (Ω cm) At 25° C. | At 85° C. |
|---|---|---|---|---|
| 9* | 8200 | 1.70 | $5.8 \times 10^{12}$ | $7.3 \times 10^{11}$ |
| 10 | 26700 | 2.13 | $6.3 \times 10^{12}$ | $8.3 \times 10^{11}$ |
| 11* | 4300 | 2.50 | $5.4 \times 10^{12}$ | $8.1 \times 10^{11}$ |
| 12 | 19400 | 2.70 | $4.2 \times 10^{12}$ | $9.1 \times 10^{11}$ |
| 13* | 4600 | 5.00 | $6.3 \times 10^{12}$ | $1.2 \times 10^{12}$ |
| 14 | 15600 | 2.81 | $7.5 \times 10^{12}$ | $2.3 \times 10^{12}$ |
| 15* | 8300 | 5.12 | $7.7 \times 10^{12}$ | $1.8 \times 10^{12}$ |
| 16* | 13000 | 1.24 | $6.8 \times 10^{12}$ | $8.7 \times 10^{11}$ |
| 17 | 15800 | 1.40 | $5.3 \times 10^{12}$ | $7.8 \times 10^{11}$ |
| 18 | 22300 | 1.87 | $5.9 \times 10^{12}$ | $7.9 \times 10^{11}$ |
| 19 | 24900 | 2.00 | $5.4 \times 10^{12}$ | $7.6 \times 10^{11}$ |
| 20 | 21500 | 1.97 | $5.1 \times 10^{12}$ | $3.8 \times 10^{11}$ |
| 21* | 9800 | 1.60 | $4.8 \times 10^{12}$ | $2.5 \times 10^{11}$ |
| 22 | 25400 | 2.10 | $7.8 \times 10^{12}$ | $4.8 \times 10^{11}$ |
| 23 | 23800 | 2.12 | $1.4 \times 10^{13}$ | $6.3 \times 10^{11}$ |
| 24 | 20700 | 2.24 | $3.8 \times 10^{12}$ | $1.9 \times 10^{11}$ |
| 25* | 18300 | 2.35 | $4.1 \times 10^{11}$ | $8.7 \times 10^{9}$ |

From the results shown in Table 2, it is apparent that the dielectric ceramic composition according to the present invention has a high dielectric constant ($\epsilon$) of not less than 15000 and a low sintering temperature less than 1150° C.

EXAMPLE 2

As raw materials, there were prepared industrial compounds, $Pb_3O_4$, MgO, $Nb_2O_5$, $TiO_2$, ZnO, CuO, $WO_3$, $BaCO_3$, $SrCO_3$, $CaCO_3$, and $MnCO_3$. The raw materials were weighed and then calcined at a temperature mentioned below for 2 hours to prepare powder of compounds $Pb(Mg_{\frac{1}{3}}Nb_{\frac{2}{3}})O_3$, $Pb(Zn_{\frac{1}{3}}Nb_{\frac{2}{3}})O_3$, $PbTiO_3$, $Pb(Cu_{1/1}W_{\frac{1}{2}})O_3$, $Sr(Cu_{\frac{1}{2}}W_{\frac{1}{2}})O_3$, and $Ca(Cu_{\frac{1}{2}}W_{\frac{1}{2}})O_3$, respectively. The sintering temperature for $PbTiO_3$ was 850° C., while that for the other compounds, $Pb(Mg_{\frac{1}{3}}Nb_{\frac{2}{3}})O_3$ and $Pb(Zn_{\frac{1}{3}}Nb_{\frac{2}{3}})O_3$, were 950° C., respectively.

The thus prepared compounds were weighed together with raw materials for subsidiary components, i.e., MgO and $MnCO_3$, in proportions shown in Table 3, and then milled with a ball mill together with 5 parts by weight of vinyl acetate binder for 10 to 20 hours by the wet process. The resultant mixture was evaporated, screened and then shaped into discs with a diameter of 12 mm and a thickness of 1.5 mm under a pressure of 1 ton/cm². The discs were fired in an lead-containing atmosphere at a temperature listed in Table 3 for 1 hour by an electric furnace.

TABLE 3

| No. | Main Component (wt %) X | Y | Z | Individual Oxides (wt %) Parts by weight Pb₃O₄ | MgO | Nb₂O₅ | TiO₂ | ZnO | Subsidiary Component (wt %) MgO | A(Cu₁W₁)O₃ | | MnO₂ |
|---|---|---|---|---|---|---|---|---|---|---|---|---|
| 26* | 95.0 | 0 | 5.0 | 69.38 | 3.86 | 25.46 | 1.30 | 0 | 0.5 | A = Pb | 1.0 | 0 |
| 27 | 98.5 | 1.0 | 0.5 | 69.13 | 4.00 | 26.66 | 0.13 | 0.08 | 0.5 | A = Pb | 3.0 | 0 |
| 28 | 89.0 | 1.0 | 10.0 | 69.60 | 3.62 | 24.13 | 2.57 | 0.08 | 0.5 | A = Pb | 2.0 | 0 |
| 29* | 80.0 | 5.0 | 15.0 | 69.75 | 3.25 | 22.73 | 3.88 | 0.39 | 0.5 | A = Pb | 4.0 | 0 |
| 30 | 89.5 | 10.0 | 0.5 | 68.89 | 3.64 | 26.56 | 0.13 | 0.78 | 0.5 | A = Pb | 3.0 | 0 |
| 31 | 87.0 | 8.0 | 5.0 | 69.16 | 3.54 | 25.38 | 1.29 | 0.63 | 0.5 | A = Ca | 5.0 | 0 |
| 32 | 80.0 | 10.0 | 10.0 | 69.36 | 3.25 | 24.02 | 2.59 | 0.78 | 0.5 | A = Sr | 4.0 | 0 |
| 33* | 85.0 | 15.0 | 0 | 68.73 | 3.45 | 26.64 | 0 | 1.18 | 0.5 | A = Pb | 2.0 | 0 |
| 34 | 80.0 | 15.0 | 5.0 | 68.97 | 3.25 | 25.31 | 1.29 | 1.18 | 0.5 | A = Pb | 3.0 | 0 |
| 35 | 73.0 | 25.0 | 2.0 | 68.55 | 2.96 | 26.00 | 0.52 | 1.97 | 0.5 | A = Ba | 2.0 | 0 |
| 36* | 65.0 | 25.0 | 10.0 | 68.96 | 2.64 | 23.87 | 2.56 | 1.97 | 0.5 | A = Pb | 3.0 | 0 |
| 37 | 59.5 | 40.0 | 0.5 | 68.06 | 2.41 | 26.25 | 0.13 | 3.15 | 0.5 | A = Pb | 2.0 | 0 |
| 38* | 55.0 | 40.0 | 5.0 | 68.29 | 2.23 | 25.04 | 1.29 | 3.15 | 0.5 | A = Pb | 2.0 | 0 |
| 39* | 80.0 | 15.0 | 5.0 | 68.97 | 3.25 | 25.31 | 1.29 | 1.18 | 0 | A = Pb | 3.0 | 0 |
| 40 | 80.0 | 15.0 | 5.0 | 68.97 | 3.25 | 25.31 | 1.29 | 1.18 | 1.0 | A = Pb | 3.0 | 0 |
| 41* | 80.0 | 15.0 | 5.0 | 68.97 | 3.25 | 25.31 | 1.29 | 1.18 | 2.0 | A = Pb | 3.0 | 0 |
| 42 | 80.0 | 15.0 | 5.0 | 68.97 | 3.25 | 25.31 | 1.29 | 1.18 | 0.5 | A = Pb | 4.0 | 0.5 |
| 43* | 80.0 | 15.0 | 5.0 | 68.97 | 3.25 | 25.31 | 1.29 | 1.18 | 0.5 | A = Pb | 4.0 | 0.7 |
| 44* | 80.0 | 15.0 | 5.0 | 68.97 | 3.25 | 25.31 | 1.29 | 1.18 | 0.5 | — | 0 | 0 |
| 45 | 80.0 | 15.0 | 5.0 | 68.97 | 3.25 | 25.31 | 1.29 | 1.18 | 0.5 | A = Sr | 0.5 | 0 |
| 46 | 80.0 | 15.0 | 5.0 | 68.97 | 3.25 | 25.31 | 1.29 | 1.18 | 0.5 | A = Pb | 5.0 | 0 |
| 47 | 80.0 | 15.0 | 5.0 | 68.97 | 3.25 | 25.31 | 1.29 | 1.18 | 0.5 | A = Pb | 7.0 | 0 |

Each of the resultant ceramic disc was provided on its both sides with silver electrodes by applying a silver paste and then baking the same at 800° C. to prepare specimens for measurements of electrical properties.

The measurements were made in the same manner as in Example 1 on dielectric constant ($\epsilon$), dielectric loss tangent (tan δ) and specific resistance ($\rho$). The temperature characteristics of capacitance was determined by change rate on temperature of capacitance which is given by the equation:

$$\text{change rate (\%)} = \frac{C(t) - C(25)}{C(25)} \times 100$$

where $C(t)$ is a capacitance at 10° C. or 85° C. and $C(25)$ is a capacitance at 25° C. Results are shown in Table 4.

In Tables 3 and 4, specimens with an asterisk (*) are those having a composition beyond the scope of the present invention, while other specimens are those included in the scope of the present invention.

TABLE 4

| No. | Sintering Temp. (°C.) | $\epsilon$ at 25° C. | tan δ at 25° C. (%) | Specific Resistance (Ω cm) at 25° C. | at 85° C. | Temperature Change Rate ΔC/C₂₅ (%) +10° C. | +85° C. |
|---|---|---|---|---|---|---|---|
| 26* | 1170 | 11400 | 0.37 | $7.5 \times 10^{12}$ | $8.8 \times 10^{11}$ | +6 | −54 |
| 27 | 1090 | 15200 | 0.21 | $6.2 \times 10^{12}$ | $8.4 \times 10^{11}$ | +10 | −55 |
| 28 | 1100 | 18300 | 0.30 | $6.5 \times 10^{12}$ | $7.1 \times 10^{11}$ | +5 | −54 |
| 29* | 1160 | 9900 | 4.09 | $9.8 \times 10^{12}$ | $9.6 \times 10^{11}$ | −8 | −46 |
| 30 | 1010 | 17400 | 0.98 | $1.3 \times 10^{13}$ | $1.2 \times 10^{12}$ | −4 | −54 |

TABLE 4-continued

| No. | Sintering Temp. (°C.) | ε at 25° C. | tan δ at 25° C. (%) | Specific Resistance (Ω cm) at 25° C. | Specific Resistance (Ω cm) at 85° C. | Temperature Change Rate ΔC/C$_{25}$ (%) +10° C. | Temperature Change Rate ΔC/C$_{25}$ (%) +85° C. |
| --- | --- | --- | --- | --- | --- | --- | --- |
| 31 | 1010 | 20700 | 0.82 | 9.9 × 10$^{12}$ | 9.1 × 10$^{11}$ | +8 | −54 |
| 32 | 1060 | 20200 | 1.36 | 1.1 × 10$^{13}$ | 1.3 × 10$^{12}$ | −10 | −53 |
| 33* | 1020 | 6500 | 1.23 | 7.6 × 10$^{12}$ | 7.4 × 10$^{11}$ | −7 | −42 |
| 34 | 1020 | 21900 | 1.68 | 8.0 × 10$^{12}$ | 7.5 × 10$^{11}$ | −8 | −51 |
| 35 | 1030 | 19800 | 2.42 | 7.8 × 10$^{12}$ | 8.3 × 10$^{11}$ | −13 | −47 |
| 36* | 1020 | 4100 | 4.59 | 8.1 × 10$^{12}$ | 7.0 × 10$^{11}$ | −13 | −45 |
| 37 | 1020 | 17300 | 2.36 | 8.3 × 10$^{12}$ | 8.7 × 10$^{11}$ | −9 | −50 |
| 38* | 1050 | 8500 | 4.98 | 8.8 × 10$^{12}$ | 9.2 × 10$^{11}$ | −15 | −39 |
| 39* | 1030 | 12500 | 1.08 | 7.7 × 10$^{12}$ | 9.4 × 10$^{11}$ | −10 | −52 |
| 40 | 1050 | 24300 | 1.79 | 5.9 × 10$^{12}$ | 5.1 × 10$^{11}$ | −11 | −55 |
| 41* | 1160 | 9000 | 1.33 | 4.1 × 10$^{12}$ | 1.9 × 10$^{11}$ | −4 | −40 |
| 42 | 1020 | 22100 | 2.17 | 7.3 × 10$^{12}$ | 4.0 × 10$^{11}$ | −9 | −49 |
| 43* | 1030 | 18200 | 2.47 | 4.6 × 10$^{11}$ | 6.3 × 10$^{9}$ | −12 | −51 |
| 44* | 1050 | 26700 | 2.13 | 6.3 × 10$^{12}$ | 8.3 × 10$^{11}$ | −15 | −60 |
| 45 | 1030 | 24200 | 2.38 | 5.2 × 10$^{12}$ | 6.1 × 10$^{11}$ | −10 | −54 |
| 46 | 1030 | 15300 | 2.01 | 1.7 × 10$^{12}$ | 1.9 × 10$^{11}$ | +3 | −49 |
| 47* | 1000 | 9400 | 2.97 | 5.3 × 10$^{10}$ | 3.6 × 10$^{8}$ | +4 | −42 |

From the results shown in Table 4, it is apparent that the dielectric ceramic composition according to the present invention has a high dielectric constant (ε) of not less than 15000 and a low sintering temperature less than 1150° C.

A compositional area for the main component falling within the scope of the present invention is defined by a polygon with vertices of A, B, C and D in FIG. 1 which shows a ternary phase diagram of the main component with numerals corresponding to the specimen numbers.

As described above, the composition of the present invention consisting essentially of a main component which, when expressed by the general formula:

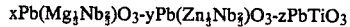

xPb(Mg$_⅓$Nb$_⅔$)O$_3$-yPb(Zn$_⅓$Nb$_⅔$)O$_3$-zPbTiO$_3$ wherein x, y, and z are weight percentage of the respective components, and x+y+z=100, has a set of x, y and z falling within the polygonal area encompassed by the four points, A (89.0, 1.0, 10.0), B (80.0, 10.0, 10.0), C (59.5, 40.0, 0.5), and D (98.5, 1.0, 0.5), and a subsidiary component consisting essentially of MgO incorporated into the main component in an amount of not more than 1.0 part by weight (except 0 part by weight) with respect to 100 part by weight of the main component.

The reasons why the dielectric ceramic composition according to the present invention has been limited to the above range are as follows.

As found in the specimens Nos. 1, 2 and 6, if the content of Pb(Zn$_⅓$Nb$_⅔$)O$_3$ is less than 1.0 wt%, the sintering temperature becomes higher than 1150° C. and the dielectric constant becomes less than 15000. As in the specimens Nos. 5 and 29, if the content of PbTiO$_3$ exceeds 10.0 wt%, the sintering temperature becomes higher than 1150° C. and the dielectric constant becomes less than 15000. Also, the dielectric loss tangent (tan δ) exceeds 3.0%.

As in the specimens Nos. 1, 9, 11 and 23, if the content of PbTiO$_3$ is less than 0.5 wt%, the dielectric constant becomes lowered and less than 15000.

As in the specimens Nos. 13, 15, 36 and 38, if a set of proportions of the three components falls within an area out of a line BC, the dielectric constant becomes considerably lowered.

The incorporation of MgO contributes to considerably improve the dielectric constant and to lower the sintering temperature of the composition. However, if the added amount of MgO exceeds 1.0 wt%, the dielectric constant becomes low and less than 15000, and the sintering temperature becomes 1150° C. and above.

Further, the incorporation of manganese as a part of the subsidiary component contributes to increase the specific resistance. However, if an added amount of manganese exceeds 0.5 parts by weight in terms of MnO$_2$ as in the specimen No. 25, the specific resistance at an elevated temperature becomes less than 10$^{11}$ Ω-cm.

The addition of the compound expressed by the formula: A(Cu$_¼$W$_¾$)O$_3$ (wherein A is one or more elements selected from the group consisting of Pb, Ba, Sr, and Ca) contributes to considerably improve the dielectric constant and to obtain good temperature characteristics of static capacitance. However, if the added amount of the compound is less than 0.5 weight % as in the specimen No. 44, the temperature change rate of dielectric constant at 85° C. exceeds −56% and does not meet the standards defined under EIA standard Z5U. If the added amount of the compound excees 5 wt% as in the specimen No. 47, the specific resistance and dielectric constant at room and elevated temperatures become considerably lowered.

As will be understood from the above, the dielectric ceramic composition of the present invention can be used as a dielectric material not only for fixed ceramic capacitors but also for monolithic ceramic capacitors. Also, the composition of the present invention makes it possible to use a relatively inexpensive silver-paradium alloy as a material for internal electrodes of monolithic ceramic capacitors. Accordingly, it is possible to manufacture monolithic ceramic capacitors with a small size for a given capacitance at a low cost.

What we claim is:

1. A dielectric ceramic composition consisting mainly of a main component composed of a solid solution of a three component system Pb(Mg$_⅓$Nb$_⅔$)O$_3$-Pb(Zn$_⅓$Nb$_⅔$)O$_3$-PbTiO$_3$, characterized in that said main component consists essentially of 68.05 to 69.60 wt% of Pb$_3$O$_4$, 2.41 to 4.00 wt% of MgO, 0.08 to 3.15 wt% of ZnO, 24.01 to 26.66 wt% of Nb$_2$O$_5$, and 0.13 to 2.59 wt% of TiO$_2$, and has a set of compositional proportions of the three components, Pb(Mg$_⅓$Nb$_⅔$)O$_3$, Pb(Zn$_⅓$Nb$_⅔$)O$_3$, and PbTiO$_3$, falling within an area defined by a polygon ABCD encompassed by points A, B, C, and D in FIG. 1, the sets of proportions of the three components at the vertices A, B, C, and D of the polygon being in weight % as follows:

|   | $Pb(Mg_{\frac{1}{3}}Nb_{\frac{2}{3}})O_3$ | $Pb(Zn_{\frac{1}{3}}Nb_{\frac{2}{3}})O_3$ | $PbTiO_3$ |
|---|---|---|---|
| A | 89.0 | 1.0 | 10.0 |
| B | 80.0 | 10.0 | 10.0 |
| C | 59.5 | 40.0 | 0.5 |
| D | 98.5 | 1.0 | 0.5 | and that a subsidiary component consisting essentially of MgO is incorporated into said main component in an amount of not more than 1.0 part by weight (except 0 part by weight) with respect to 100 part by weight of the main component.

2. The dielectric ceramic composition according to claim 1 further containing manganese, as a part of the subsidiary component, the content of manganese being not more than 0.5 part by weight (except 0 part by weight) in terms of $MnO_2$ with respect to 100 parts by weight of the main component.

3. The dielectric ceramic composition according to claim 1 further containing, as a part of the subsidiary component, a compound represented by the general formula:

$A(Cu_{\frac{1}{2}}W_{\frac{1}{2}})O_3$ (wherein A is one or more elements selected from the group consisting of Pb, Ba, Sr, and Ca), the content of said compound being from 0.5 to 5.0 parts by weight with respect to 100 parts by weight of the main component.

4. The dielectric ceramic composition according to claim 1 further contains, as a part of the subsidiary component, manganese and a compound represented by the general formula: $A(Cu_{\frac{1}{2}}W_{\frac{1}{2}})O_3$ (wherein A is one or more elements selected from the group consisting of Pb, Ba, Sr, and Ca), the content of manganese being not more than 0.5 part by weight in terms of $MnO_2$ with respect to 100 parts by weight of the main component and, the content of said compound being 0.5 to 5.0 parts by weight with respect to 100 parts be weight of the main component.

5. The dielectric ceramic composition according to claim 1 in which the amount of $Pb_3O_4$ in the main component is 68.06 to 69.36 weight % and the amount of $Nb_2O_5$ is 24.02 to 26.66 weight %.

6. The dielectric ceramic composition according to claim 2 in which the content of manganese is 0.1 to 0.5 weight %.

7. The dielectric ceramic composition according to claim 3 wherein A is Pb and the amount of lead containing compound is 1 to 4 weight %.

8. The dielectric ceramic composition according to claim 1 wherein said set of compositional proportions of the three components falls within an area defined by the triangle BCD in FIG. 1.

* * * * *